United States Patent [19]
McGrath et al.

[11] Patent Number: 5,901,925
[45] Date of Patent: May 11, 1999

[54] SERRATED-PLANFORM LIFTING-SURFACES

[75] Inventors: Brian E. McGrath, Columbia, Md.; Richard M. Wood, Virginia Beach, Va.

[73] Assignee: Administrator, National Aeronautics and Space Administration, Washington, D.C.

[21] Appl. No.: 08/734,820

[22] Filed: Oct. 22, 1996

Related U.S. Application Data

[60] Provisional application No. 60/025,806, Aug. 28, 1996.

[51] Int. Cl.$^6$ ......................................................... B64C 1/26
[52] U.S. Cl. ............................................. 244/45 A; 244/199
[58] Field of Search .............................. 244/45 R, 45 A, 244/13, 15, 199

[56] References Cited

U.S. PATENT DOCUMENTS

| | | | |
|---|---|---|---|
| 2,924,400 | 2/1960 | Ruget | 244/45 A |
| 3,471,107 | 10/1969 | Ornberg | 244/199 |
| 3,883,094 | 5/1975 | Mederer | 244/45 A |
| 4,378,922 | 4/1983 | Pierce | 244/199 |
| 4,569,494 | 2/1986 | Sakata | 244/45 A |
| 5,088,665 | 2/1992 | Vijgen et al. | |
| 5,282,591 | 2/1994 | Walters et al. | |
| 5,518,204 | 5/1996 | Tracy | 244/45 R |
| 5,542,625 | 8/1996 | Burhans, Jr. et al. | 244/45 A |

FOREIGN PATENT DOCUMENTS

| | | | |
|---|---|---|---|
| 2421524 | 5/1974 | Germany | 244/45 A |
| 3132959 | 3/1983 | Germany | 244/45 A |

OTHER PUBLICATIONS

J.E. Lamar, "Nonlinear lift control at high speed and high angle of attack using vortex flow technology", AGARD Report No. 740, Feb. 17–21, 1986, pp. 4–1–4–16, 4–19, 4–20, 4–21, 4–22.

J.E. Lamar et al., "Aerodynamic features of designed strake–wing configurations", AIAA–81–1214, Jun. 23–25, 1981, pp. 1–10.

S. B. Kern, "A numerical investigation of vortex flow control through small geometry modifications at the strake/wing junction of a cropped double–delta wing", AIAA–92–0411, Jan. 6–9, 1992, pp. 1–16.

*Primary Examiner*—Galen L. Barefoot
*Attorney, Agent, or Firm*—Kimberly A. Chasteen; Bart A. Singer

[57] ABSTRACT

A novel set of serrated-planform lifting surfaces produce unexpectedly high lift coefficients at moderate to high angles-of-attack. Each serration, or tooth, is designed to shed a vortex. The interaction of the vortices greatly enhances the lifting capability over an extremely large operating range. Variations of the invention use serrated-planform lifting surfaces in planes different than that of a primary lifting surface. In an alternate embodiment, the individual teeth are controllably retractable and deployable to provide for active control of the vortex system and hence lift coefficient. Differential lift on multiple serrated-planform lifting surfaces provides an means for vehicle control. The important aerodynamic advantages of the serrated-planform lifting surfaces are not limited to aircraft applications but can be used to establish desirable performance characteristics for missiles, land vehicles, and/or watercraft.

8 Claims, 15 Drawing Sheets

SERRATED-PLANFORM LIFTING-SURFACES

This application claims the benefit of U.S. Provisional Application No.: 60/025,806, filed Aug. 28, 1996.

ORIGIN OF THE INVENTION

The invention described herein was jointly made by an employee of the United States Government and in the performance of work under a NASA Contract and is subject to the provisions of Section 305 of the National Aeronautics and Space Act 1958, as amended, Public Law 85-568 (72 Stat. 435; 42 U.S.C. 2457).

BACKGROUND OF THE INVENTION

1. Technical Field of Invention

This invention relates to aerodynamic lifting surfaces; in particular, surfaces having a serrated-planform shape.

2. Description of the Related Art

High-angle-of-attack aerodynamics is of great importance to modern peace-keeping aircraft where the ability to fly at stall and post-stall angles-of-attack can mean the difference between life and death. To efficiently fly an aircraft at stall and post-stall conditions, the aircraft should be capable of achieving exceedingly high lift and having exceptional handling capabilities over an extremely wide range of flight conditions.

Fighter aircraft often employ thin, highly swept wings with low aspect ratios to minimize wave drag at supersonic cruise and to enhance maneuverability at all speeds. The prototypical wing designs include variations of arrow-, delta-, and diamond-shaped planforms. On all of these wings, at positive angles-of-attack, the boundary layer on the pressure surface moves outward and separates as it goes around the leading edge. This process forms a free-shear layer that curves upward and then inboard, rolling into a wing vortex on the suction surface of the wing. The wing vortex contributes substantially to the total lifting force on the wing. The total lift coefficient for the wing is conveniently split into a sum of two distinct contributions, a first contribution that accounts for the ordinary potential-flow lift, and a second contribution, known as the vortex-induced lift. Out of context, the term "vortex-induced lift" can be misleading, since all lift is due to vorticity in the flow. Here we use the term "vortex-induced lift" to refer to the extra lift produced by the presence of one or more coherent vortex structures over the wing.

Various forebody devices, such as leading-edge extensions, strakes, and canards provide additional vortex-shedding surfaces that are known to be useful for further increasing the lift and improving aerodynamic characteristics. Each forebody typically produces one or more strong forebody vortices that often persist over a primary lifting surface or wing and contribute to the vortex-induced lift. As with the wing vortices, the forebody vortices energize the boundary layer on the suction surface of the primary wing, thus helping to keep the primary-wing boundary layer attached to the primary wing at higher angles-of-attack. The maintenance of an attached boundary layer over the primary wing, greatly increases the lift and the lift-to-drag efficiency of the aircraft.

As an example, Skow [U.S. Pat. No. 5,249,762 (1993)] discloses strakes mounted forward and above the plane of the primary wing. The strakes reduce buffet on the wings and result in a more positive pitching moment and therefore better longitudinal stability at high angles of attack. These features allow for landings at higher angles-of-attack, with the resultant higher lift coefficient and decreased landing speed. The intended embodiment of the invention is for use on a T-38 aircraft. On this aircraft, the strakes are mounted on the engine nacelles, just forward of the wing leading edge, and at an elevation substantially above the plane of the wing. On the T-38, the patent claims that the invention performs better than leading-edge extensions.

In general, the vortex-induced lift acts only as long as the relevant vortex structures remain coherent and positioned near the wing surface. Unfortunately, at large angles-of-attack, both the wing and forebody vortices become unstable and burst into largely incoherent masses of turbulence. The further aft the breakdown occurs, the longer the extent of the region of vortex-induced lift. Lamar ["Nonlinear lift control at high speed and high angle of attack using vortex flow technology," in AGARD Report 740 (1982), available from NTIS, 5285 Port Royal Rd, Springfield, Va. 22161] discusses a variety of methods used to delay the onset of vortex bursting. Lamar (1982) states that three particularly promising innovations for delaying vortex breakdown are: the fluid strake (a jet sheet formed by blowing through a series of in-line orifices on the fuselage ahead of the wing); spanwise blowing over the main wing; and vortex pumping through the use of suction on the primary wing. Note that he does not mention the use of additional lifting surfaces in his list of promising innovations.

Computations by Kern [AIAA Paper 92-0411 (1992), available from AIAA, 370 L'Enfant Promenade, S.W., Washington, D.C. 20024] suggest that minor changes in the geometry of a strake-wing junction can vastly alter the interaction of the strake vortex with the wing vortex. These geometry changes can be used to vary the vortex-breakdown position. Walters and Kern [U.S. Pat. No. 5,282,591 (1994)] use these ideas to develop active vortex control for a high-performance wing. The invention comprises two slidably adjustable panels that can be arranged in various configurations during flight. The panels, when not in use, are retracted and stowed, thus resulting in a first strake/wing junction configuration that produces a strake vortex and a wing vortex. A second configuration produces a continuous transition from the strake to the wing. The second configuration results in a combined strong vortex that bursts closer to the apex of the wing, thus reducing the lift on the wing. A third configuration that employs a straight-line transition from the strake to the wing has an additional abrupt junction that produces a fillet vortex, which is weaker than the strake and wing vortices. The burst location of the vortices is further downstream compared to the first configuration. Finally, a fourth configuration provides a diamond-shaped fillet that adds yet another junction. The fillet vortex produced in this configuration is weaker than that of the third configuration. The vortex burst point is further delayed.

Because the highly nonlinear nature of vortex flows makes the behavior of the forebody vortices and the wing vortices very difficult to predict, another very useful approach for delaying vortex breakdown and dramatically increasing vortex-induced lift over a wide range of angles-of-attack has been overlooked by all prior innovators.

SUMMARY OF THE INVENTION

The present invention pioneers a novel set of lifting-surface planform geometries that produce unexpectedly high lift coefficients at moderate to high angles-of-attack. In the invention, a lifting surface has a serrated-planform shape.

The serrated-planform lifting surface is generally employed as a forebody upstream of a primary lifting surface. Each serration or tooth of the serrated-planform lifting surface is designed to form a tooth vortex that contributes to the vortex field of the aerodynamic configuration. The multiple vortices are distributed over the suction surfaces in a way that greatly enhances the lifting capability. The increased lift is observed over an extremely large operating range. Even when the induced drag is considered, the configuration has a greater lift coefficient for any given value of induced drag coefficient than does a baseline configuration consisting of a strake and a primary lifting surface on either side of a longitudinal axis.

Including additional or more energetic vortices in the flow over the wing does not necessarily improve the lifting capability; the relative placement and interaction of the vortices are important. With reference to a strake-vortex/wing-vortex interaction, Lamar and Frink [AIAA Paper 81-1214 (1981)] comment, "at the higher values of alpha, the strake vortex becomes much larger and tends to displace the wing-vortex-flow system off the wing, so that this system can no longer cause flow reattachment to occur on the wing. This lack of reattachment causes a large portion of theoretically available aerodynamic effects to be effectively lost to the configuration." Hence improved performance (in terms of lift coefficient) is not an obvious consequence of the introduction of additional vortices. The interaction of the vortices is highly nonlinear and therefore very difficult to predict beforehand. Results that will be presented below indicate that, under certain conditions, the inclusion of too many vortices detracts from the overall performance.

A variation of the serrated-planform lifting surface is mounted on a fuselage out of the plane of the primary lifting surface. Each tooth is optionally in its own individual plane or the teeth are coplanar but in a different plane than that of the primary lifting surface. In a further embodiment, the teeth are rotated out of the plane of the primary lifting surface. Although these alternative arrangements can be used in numerous applications, different planes for the serrated-planform lifting surface and the primary lifting surface are quite likely to be useful when the primary lifting surface under consideration is a tail surface, especially in butterfly-tailed vehicles.

In another variation of the serrated lifting surface planforms, the teeth are moveable to provide for interactive control of the vortex system. The individual teeth are separately deployable to provide for maximum control. The Walters and Kern (1994) patent described above also provides for moveable surfaces to be deployed between a strake and a primary lifting surface. In one configuration, the panels form a diamond-shaped fillet between the strake and the primary lifting surface. This configuration is similar to a single tooth of the current serrated-planform lifting surface. Although Walters and Kern (1994) indicate that the diamond-shaped fillet delays the vortex-burst and hence results in increased lift, the patent fails to suggest any unexpectedly large performance gains potentially achievable by the use of a longitudinal array of diamond-shaped fillets to form a serrated-planform lifting surface.

The important aerodynamic advantages of the serrated-planform lifting surface are not limited to aircraft applications. The serrated-planform lifting surface can be used to establish desirable performance characteristics for missiles, land vehicles, and/or watercraft. In some of these applications, the serrated-planform lifting surface does not need to be located upstream of a separate primary lifting surface; instead, the serrated-planform lifting surface itself acts as the primary lifting surface.

The serrated-planform lifting surface achieves the following important objects:

(a) provides increased lift coefficient over an extensive angle-of-attack range;

(b) decreases the induced drag coefficient for a given lift coefficient up to the maximum lift condition; and (c) provides increased lift coefficient for a given induced drag coefficient for a large angle-of-attack range.

Other objects of the serrated-planform lifting surface will be clear from the detailed description.

BRIEF DESCRIPTION OF THE DRAWINGS

In the drawings, closely related figures have the same number but different alphabetic suffixes.

FIG. 1 generally shows symmetric planform designs for configurations with each primary lifting surface having a 35 degree leading-edge sweep. The large arrows indicate the relative motion of the mean flow in the preferred orientation.

FIG. 2 generally shows symmetric planform designs for configurations with each primary lifting surface having a 60 degree leading-edge sweep.

FIG. 4 shows symmetric planform designs with a 30 degree diamond wing as a primary lifting surface on each side.

FIG. 5 generally shows symmetric planforms for configurations with each trapezoidal primary lifting surface having a 40 degree leading edge and a 30 degree trailing edge. Some configurations also include a forebody strake.

FIG. 6 generally shows symmetric planforms for configurations with each trapezoidal primary lifting surface having a 30 degree leading edge and a 20 degree trailing edge.

FIG. 8 shows data for most of the trapezoidal configurations with a 40 degree leading edge and a 30 degree trailing edge. The tests were conducted in the NASA Langley Research Center Subsonic Basic Research Tunnel at a Mach number of 0.14. The symbols are explained in Table 1.

Figure 1A:
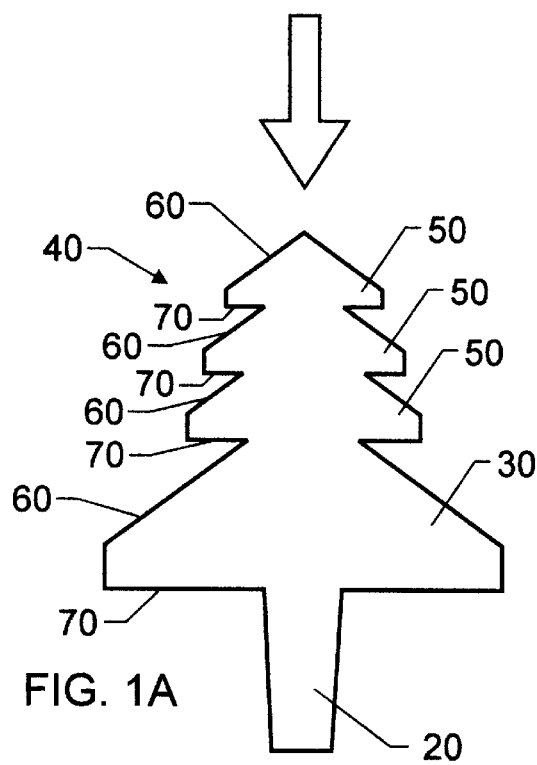
FIG. 1A shows a three-tooth serrated-planform lifting surface upstream of each primary lifting surface.

REFERENCE NUMERALS 20 fuselage
25 strake
30 primary lifting surface
40 serrated-planform lifting surface
50 tooth
60 leading edge
70 trailing edge
80 wing
100 tailplane
110 tailpost
120 butterfly tail

DETAILED DESCRIPTION OF THE PREFERRED EMBODIMENTS

Figure 1B:
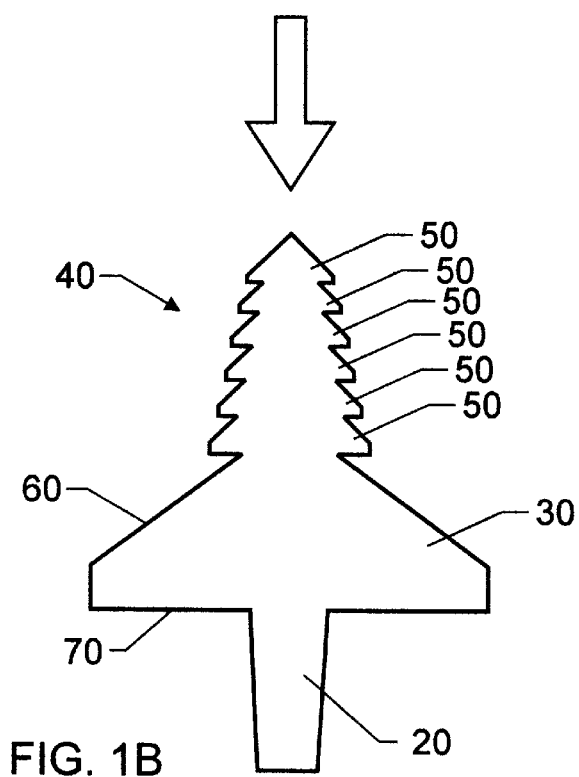
FIG. 1B shows a six-tooth serrated-planform lifting surface upstream of each primary lifting surface.
Figure 2A:
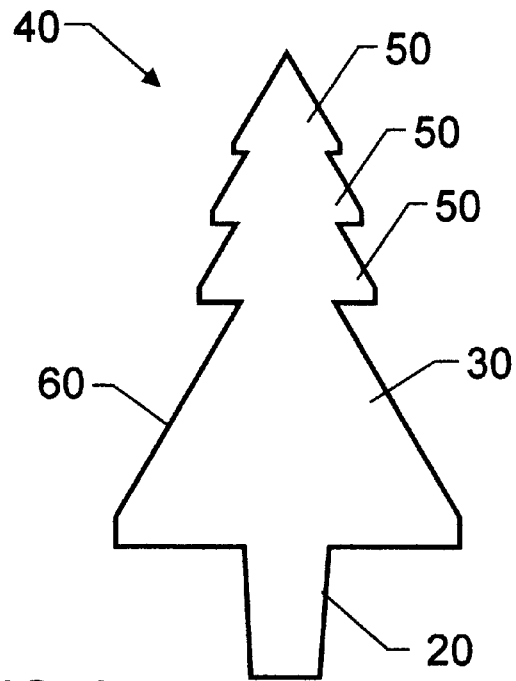
FIG. 2A shows a three-tooth serrated-planform lifting surface upstream of each primary lifting surface.
Figure 2B:
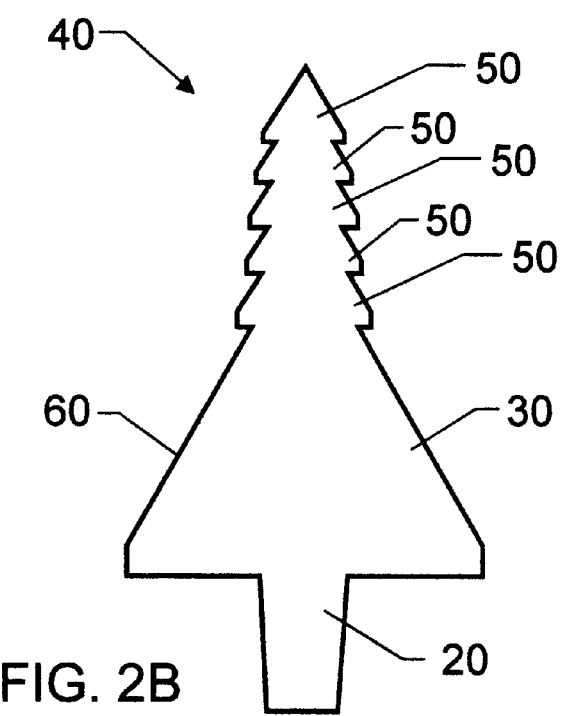
FIG. 2B shows a six-tooth serrated-planform lifting surface upstream of each primary lifting surface.
Figure 10:
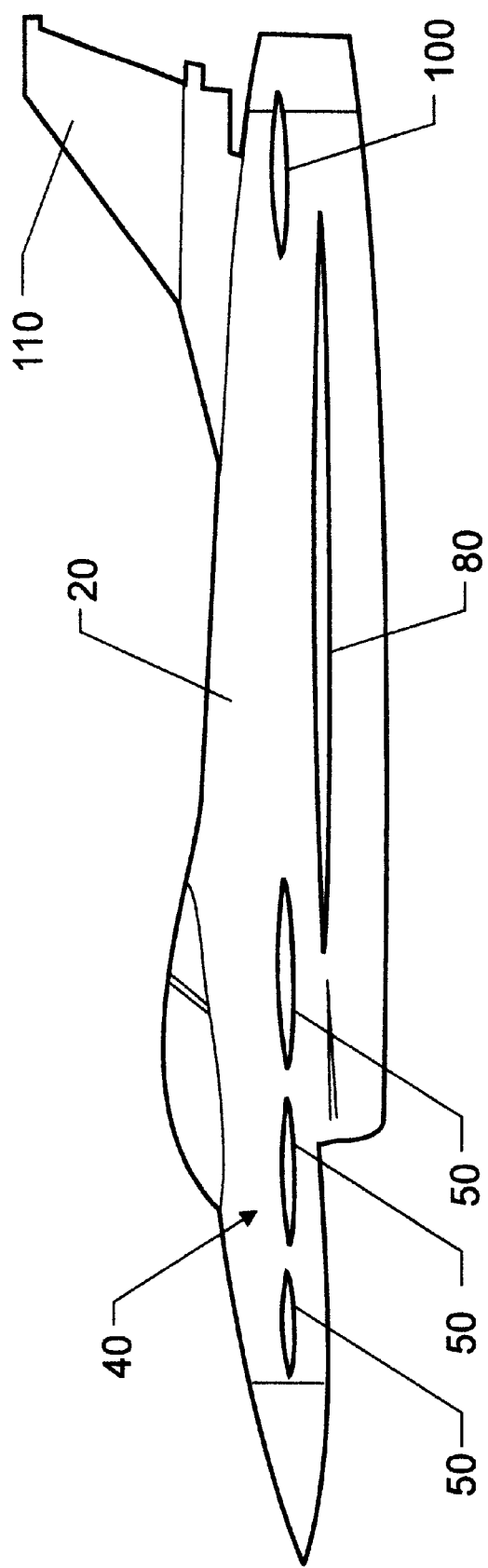
FIG. 10 illustrates an aircraft with a serrated-planform lifting surface upstream and above each primary lifting surface.

FIG. 1A shows a typical embodiment of the invention. The figure illustrates a configuration comprising a central body or fuselage 20, a primary lifting surface 30 disposed on each side of a longitudinal axis, and a serrated-planform lifting surface 40 located forward of each primary lifting surface 30. In its preferred arrangement, the configuration is situated in a flowing medium such that the mean relative motion of the fluid is essentially as indicated by the large arrow in FIG 1A. In this embodiment, each primary lifting surface 30 is half of a cropped delta wing which has a leading edge 60 with a 35 degree sweep angle. Each serrated-planform lifting surface 40 includes three teeth 50. Each tooth 50 is also shaped in the form of half of a cropped delta wing. When the configuration moves with a positive angle-of-attack relative to a fluid medium, each tooth is designed to shed a tooth vortex which travels downstream, thereby contributing to lift and providing improved attachment of the flow to the suction surfaces. FIG. 1B illustrates a similar configuration, but in which each serrated-planform lifting surface 40 includes six teeth 50. In both FIGS. 1A and 1B, individual teeth 50 located further aft have wider spans than those located upstream. Although the progression to wider spans is typically desirable because it helps displace successive tooth vortices from each other, the progression is not necessary, as some later embodiments of the invention will show. FIG. 1B also shows that the shape of teeth 50 can change within each serrated-planform lifting surface 40. In FIG. 1B, the foremost of teeth 50 is cropped, but the aftmost of teeth 50 is not cropped. Although not illustrated, individual teeth 50 within each serrated-planform lifting surface 40 are optionally quite different, although in the preferred modes, the variations between neighboring teeth 50 are typically quantitative in nature. Such variations might include the span, the amount of cropping, and the sweep angle. On each tooth 50 leading edge 60 and trailing edge 70 are distinct. Consecutive teeth 50 generally abut trailing edge 70 to subsequent leading edge 60 as shown in FIG. 1A and 1B, but abutment of adjacent teeth 50 is not required. Other embodiments of serrated-planform lifting surface 40 have space separating adjacent teeth 50. An application with nonabutting adjacent teeth is shown in FIG. 10, which is discussed below. Leading edge 60 and trailing edge 70 of each tooth 50 are preferably aerodynamically sharp, although this feature is not necessary and may not be desired for some applications.

Figure 3:
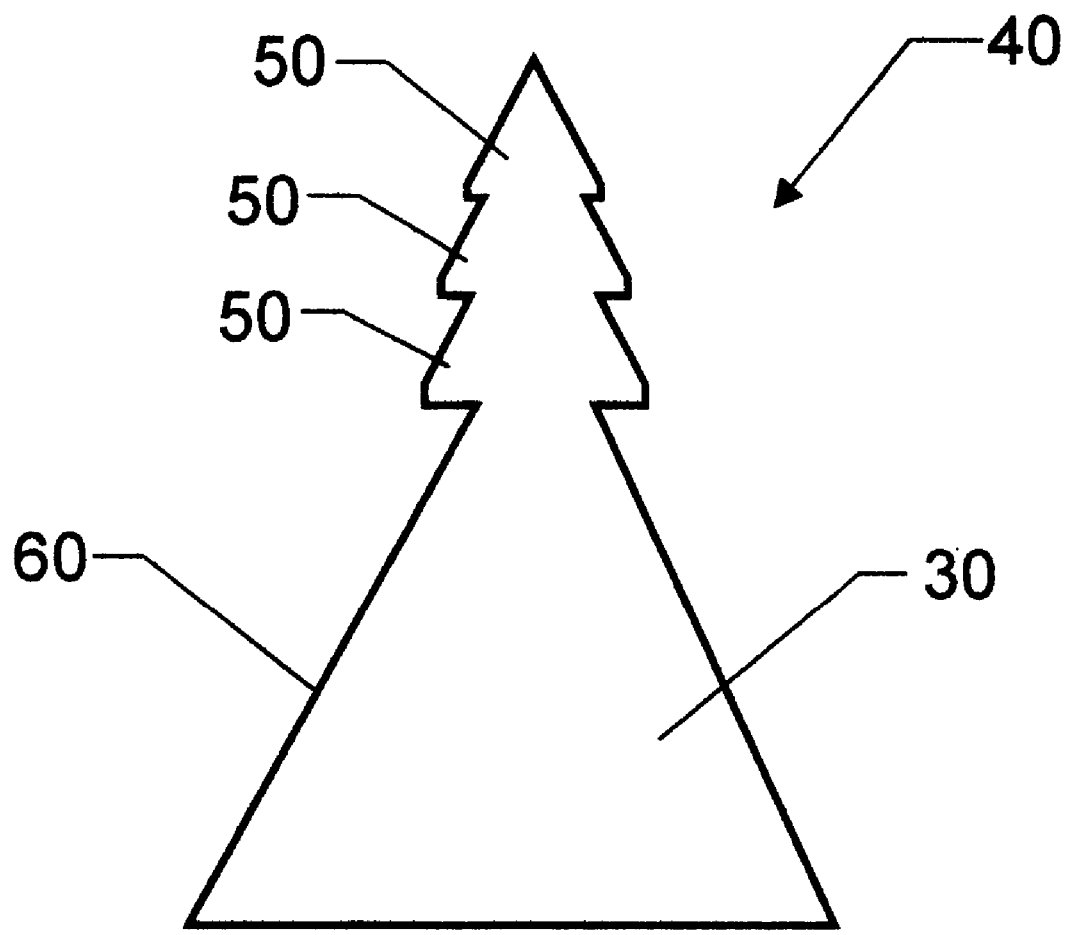
FIG. 3 illustrates a symmetric 65 degree delta wing with a three-tooth serrated-planform lifting surface upstream of each primary lifting surface.
Figure 4A:
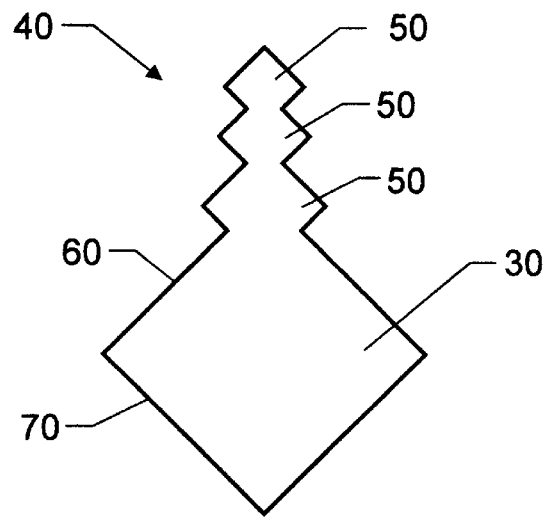
FIG. 4A illustrates a variable-span three-tooth serrated-planform lifting surface upstream of each primary lifting surface.
Figure 4B:
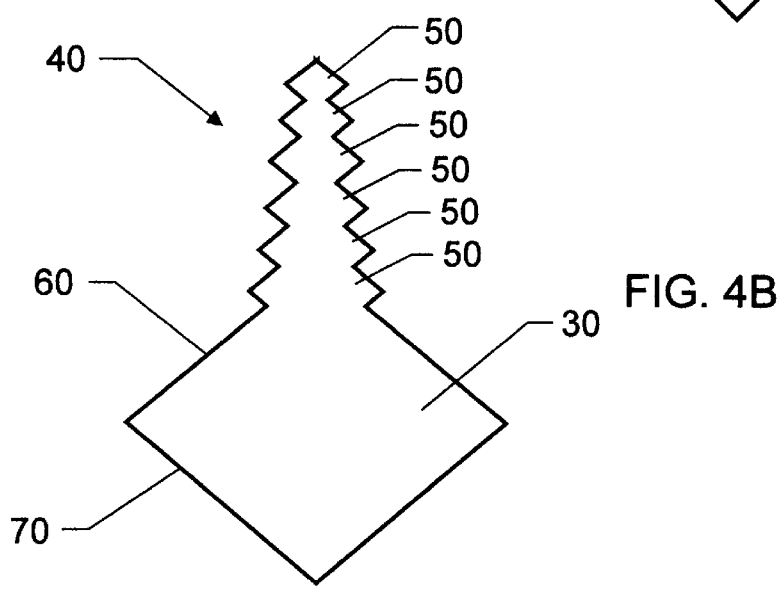
FIG. 4B illustrates a variable-span six-tooth serrated-planform lifting surface upstream of each primary lifting surface.
Figure 4C:
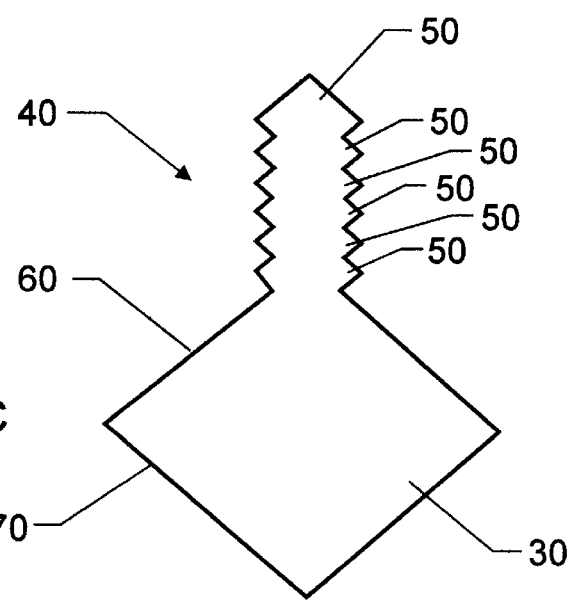
FIG. 4C illustrates a constant-span six-tooth serrated-planform lifting surface upstream of each primary lifting surface.
Figure 5A:
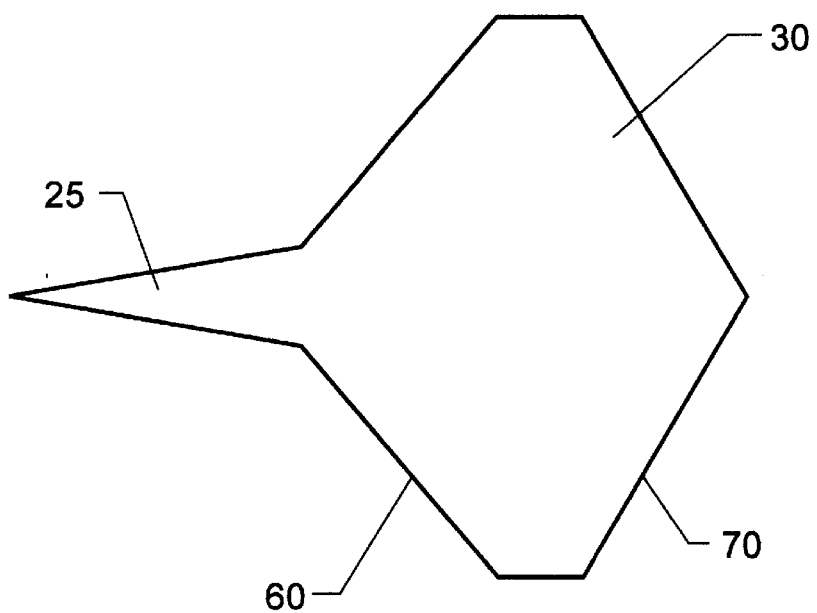
FIG. 5A represents the baseline trapezoidal wing with a strake, the combination of which is known as prior art.
Figure 5B:
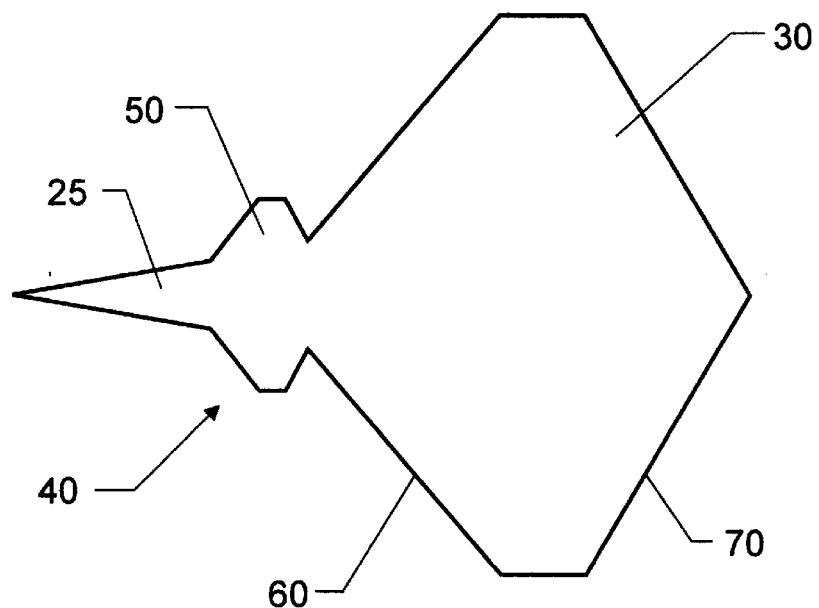
FIG. 5B includes a one-tooth serrated-planform lifting surface upstream of each primary lifting surface.
Figure 5C:
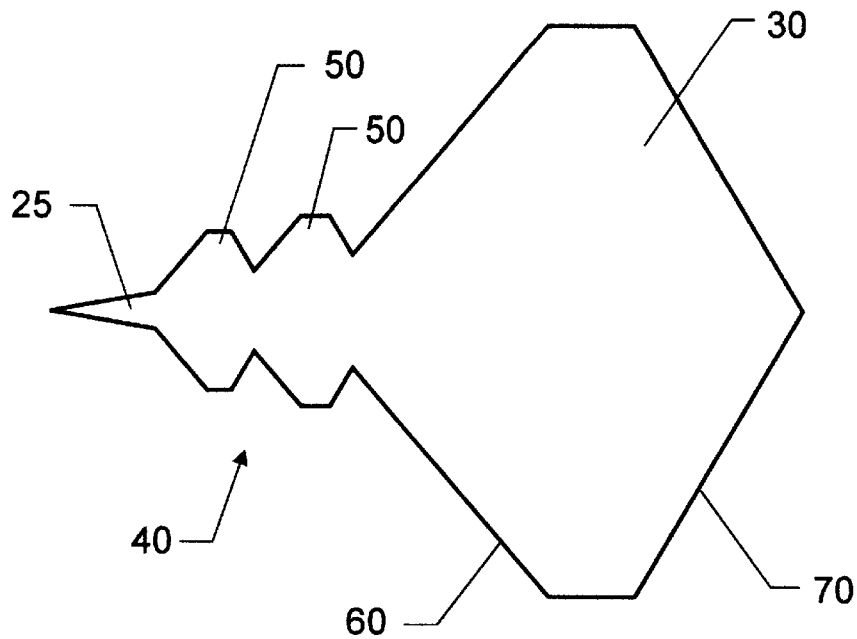
FIG. 5C includes a two-tooth serrated-planform lifting surface upstream of each primary lifting surface.
Figure 5D:
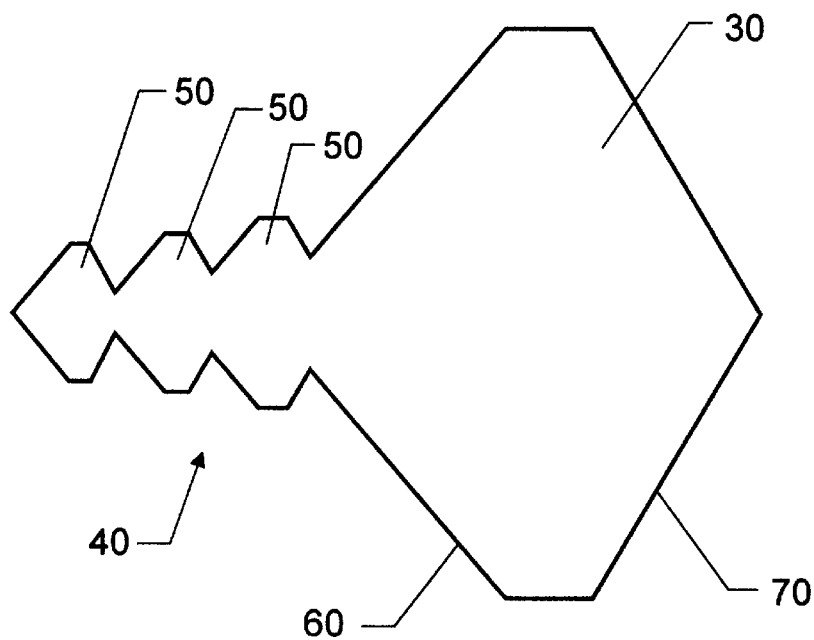
FIG. 5D includes a three-tooth serrated-planform lifting surface upstream of each primary lifting surface.
Figure 5E:
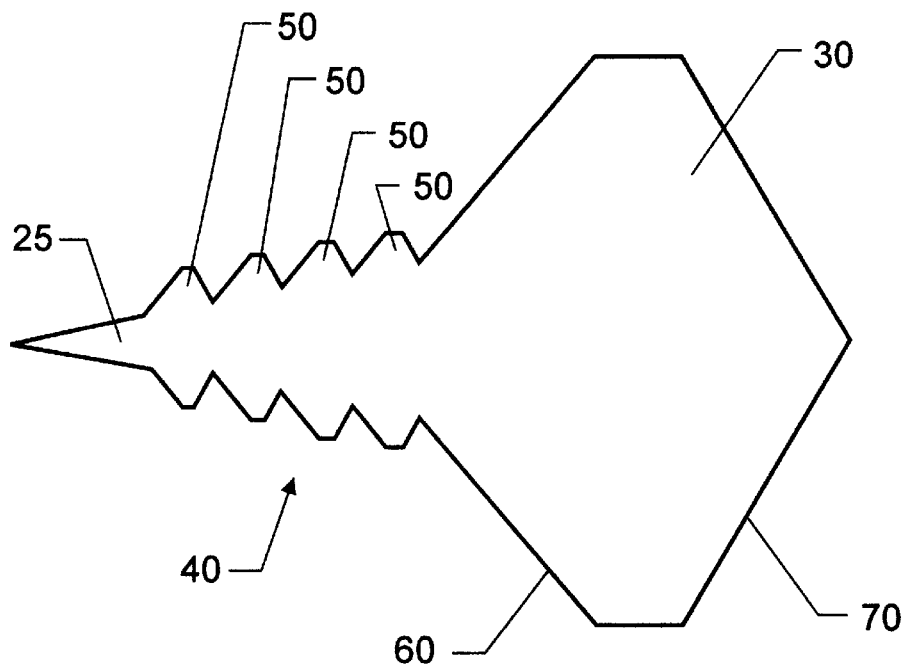
FIG. 5E includes a four-tooth serrated-planform lifting surface upstream of each primary lifting surface.
Figure 5F:
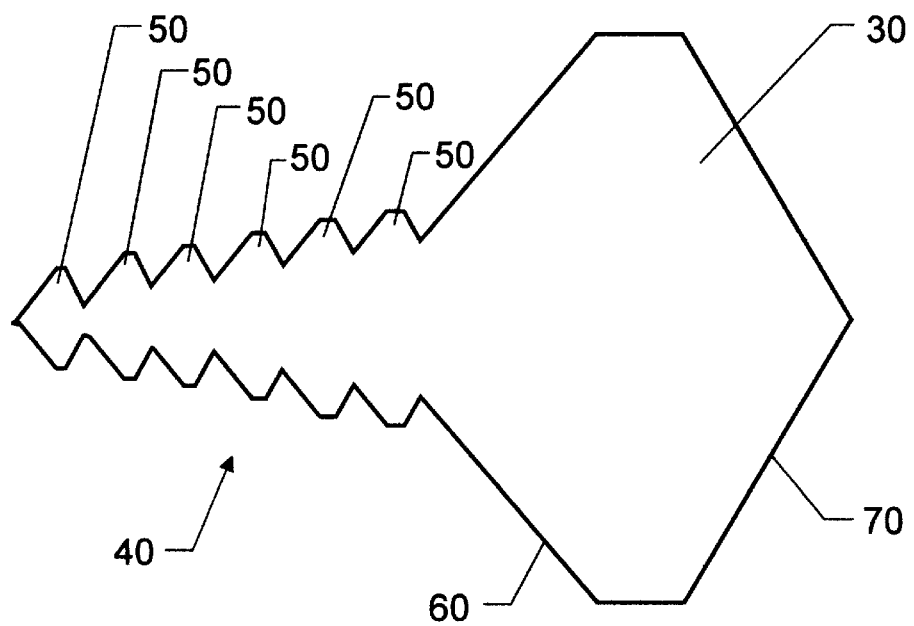
FIG. 5F includes a six-tooth serrated-planform lifting surface upstream of each primary lifting surface.

A variety of different embodiments are illustrated in FIGS. 2–6. FIGS. 2A and 2B respectively show cropped delta wings with 60 degree leading-edge sweeps having three- and six-tooth serrated-planform lifting surfaces. In these embodiments, teeth 50 are not cropped. FIG. 3 indicates each primary lifting surface 20 being uncropped and each serrated-planform lifting surface 40 having three uncropped teeth 50. In FIGS. 4A, 4B, and 4C, each primary lifting surface 30 is half of a diamond wing with a 30 degree sweep. FIG. 4A shows each serrated-planform lifting surface 40 having three teeth 50 while FIG. 4B shows each serrated-planform lifting surface 40 having six teeth 50. In both cases, the spans increase aftward. In FIG. 4C, each serrated-planform lifting surface 40 has six teeth 50, but each tooth 50 has the same span.

Figure 6A:
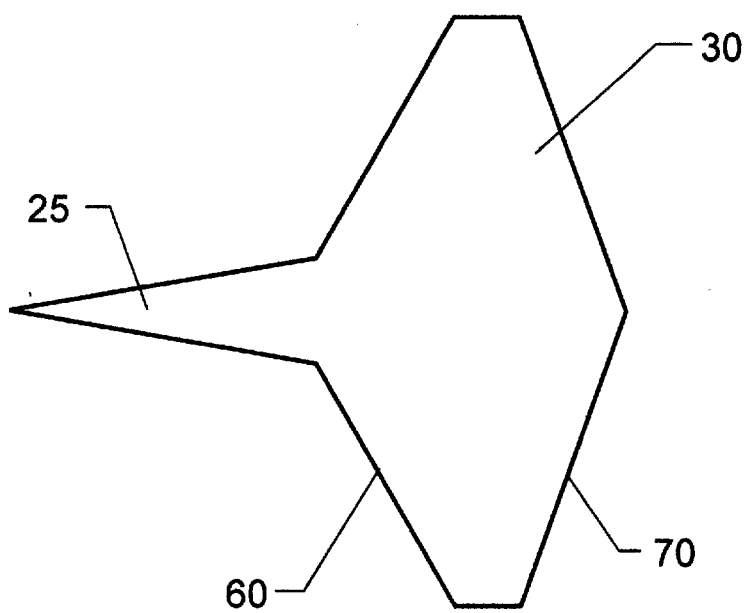
FIG. 6A represents the baseline trapezoidal wing which is known as prior art.
Figure 6B:
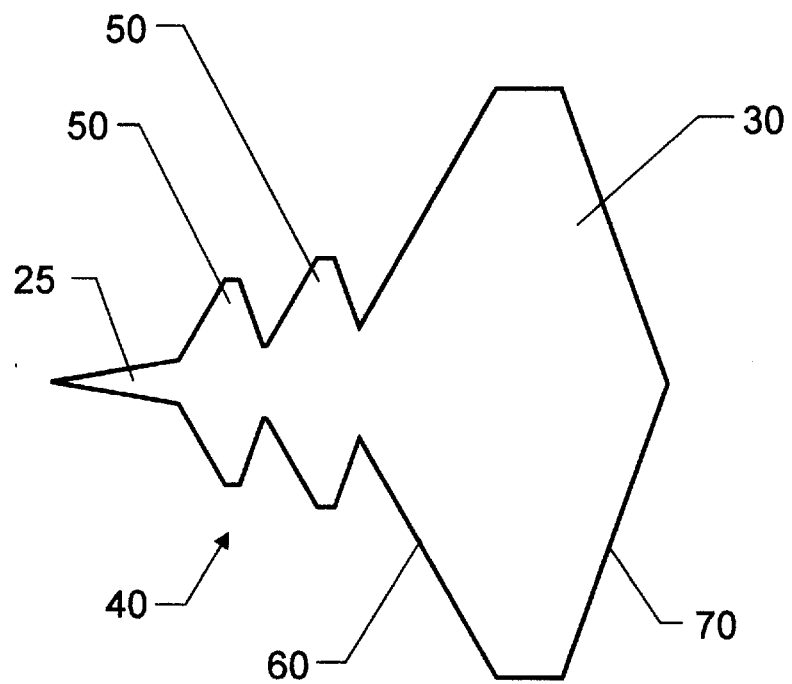
FIG. 6B includes a two-tooth serrated-planform lifting surface upstream of each primary lifting surface.
Figure 6C:
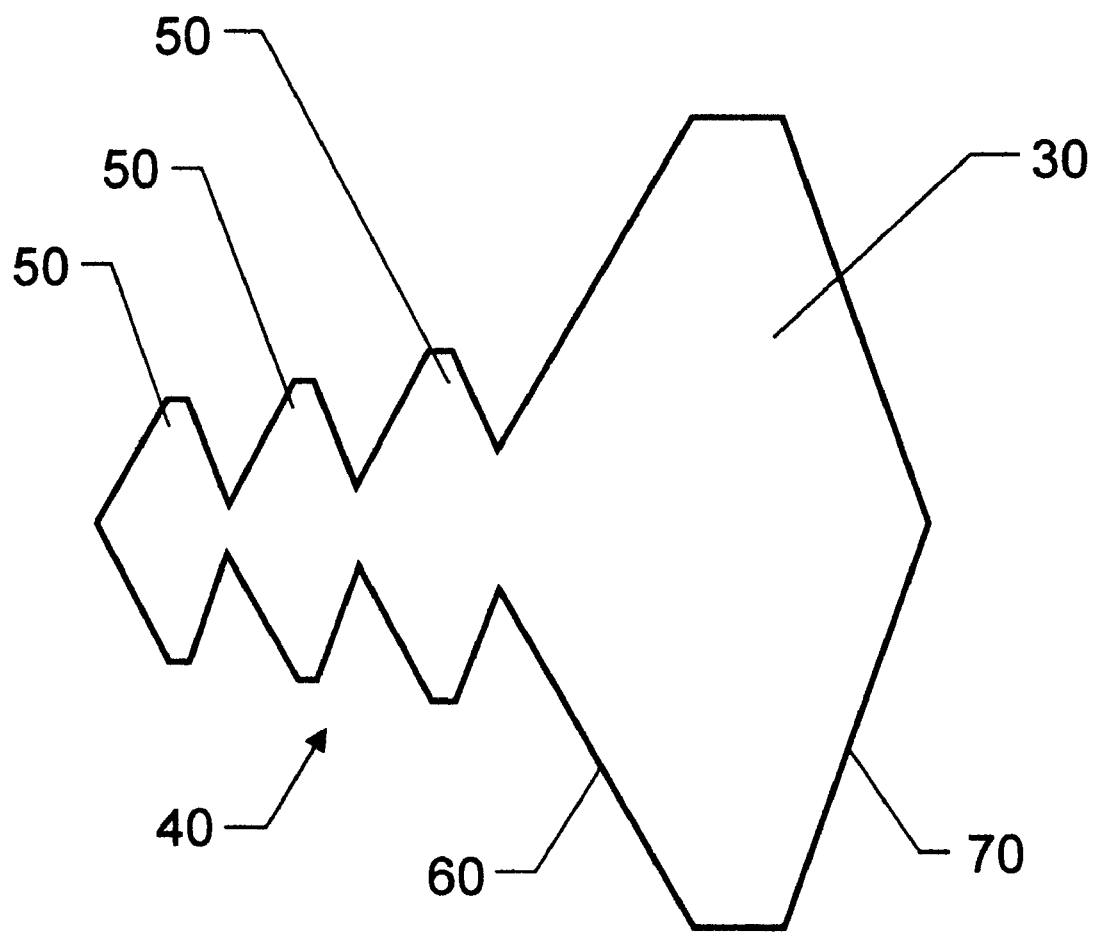
FIG. 6C includes a three-tooth serrated-planform lifting surface upstream of each primary lifting surface.

The embodiments shown in FIGS. 5 and 6 are especially important because extensive wind-tunnel tests have been performed on each of these configurations. These configurations include a highly swept forebody, known as a strake 25, that merges with each primary lifting surface 30. In FIGS. 5–6, each primary lifting surface 30 has a trapezoidal shape with leading edge 60 and a trailing edge 70. Similarly, each tooth 50 has a trapezoidal shape. The trapezoids are characterized by the slope of the leading edge and the slope of the trailing edge such that a LE/TE trapezoid lifting surface is a lifting surface having a trapezoidal shape with a leading edge sweep of LE degrees and trailing edge swept back TE degrees. Using this notation, the configurations in FIGS. 5A–5F all use 40/30 trapezoids for each primary lifting surface 30 and each tooth 50. FIG. 5A illustrates a baseline configuration with no serrated-planform lifting surface and is indicated as prior art since strake-wing configurations are well known. FIG. 5B has one-tooth serrated-planform lifting surfaces 40; FIG. 5C has two-tooth serrated-planform lifting surfaces 40; FIG. 5D has three-tooth serrated-planform lifting surfaces 40; FIG. 5E has four-tooth serrated-planform lifting surfaces 40; and FIG. 5F has six-tooth serrated-planform lifting surfaces 40. In FIGS. 6A, 6B, and 6C, 30/20 trapezoids are used for each primary lifting surface 30 and each tooth 50. FIG. 6A illustrates a prior art baseline configuration with no serrated-planform lifting surface, but with strake 25 disposed upstream of each primary lifting surface 30. FIG. 6B has two-tooth serrated-planform lifting surfaces 40 and FIG. 6C has three-tooth serrated-planform lifting surfaces 40.

The configurations shown in FIGS. 5A–F and FIGS. 6A–C were studied in various wind-tunnel tests. Because results with the 30/20 trapezoids (FIGS. 6A–C) are similar to those obtained for the 40/30 trapezoids (FIGS. 5A–F), only the results for the tests with the 40/30 trapezoids are presented herein.

Figure 7:
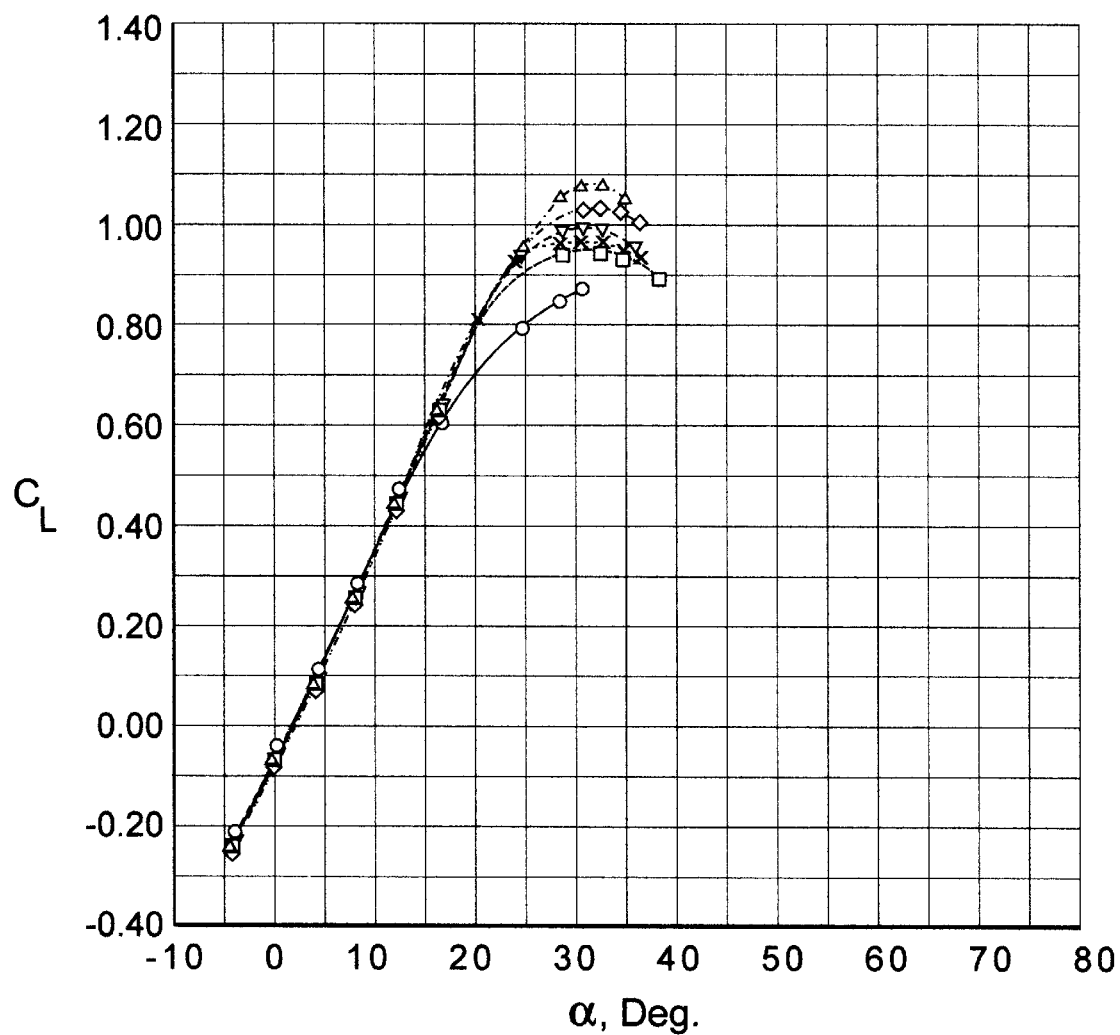
FIG. 7 indicates lift coefficient versus angle-of-attack for configurations with each trapezoidal primary lifting surface having a 40 degree leading edge and a 30 degree trailing edge. The tests were conducted in the NASA Langley Research Center 7-foot by 10-foot High Speed Wind Tunnel at a Mach number of 0.2. The symbols are explained in Table 1.

Tests were performed in two separate wind tunnels. In what follows, the lift coefficient is defined as the lift divided by the product of the planform area and the dynamic pressure. Similarly, the drag coefficient is defined as the drag divided by the product of the planform area and the dynamic pressure. All of the configurations in FIGS. 5A–F were tested in the NASA Langley Research Center 7-foot by 10-foot High Speed Wind Tunnel at a Mach number of 0.2. Practical considerations related to the wind tunnel and measurement apparatus prevented testing the models at angles-of-attack much greater than that which corresponded to the maximum lift coefficient. The lift coefficient versus angle-of-attack is plotted as FIG. 7. Each curve is associated with symbols that are defined in Table 1.

TABLE 1

| | |
|---|---|
| — ○ — | 46°/30° Trapezoidal Planform |
| — □ — | One-Tooth 40°/30° Trapezoidal Planform |
| — ◇ — | Two-Tooth 40°/30° Trapezoidal Planform |
| — △ — | Three-Tooth 40°/30° Trapezoidal Planform |
| — ▽ — | Four-Tooth 40°/30° Trapezoidal Planform |
| — X — | Six-Tooth 40°/30° Trapezoidal Planform |

Figure 8A:
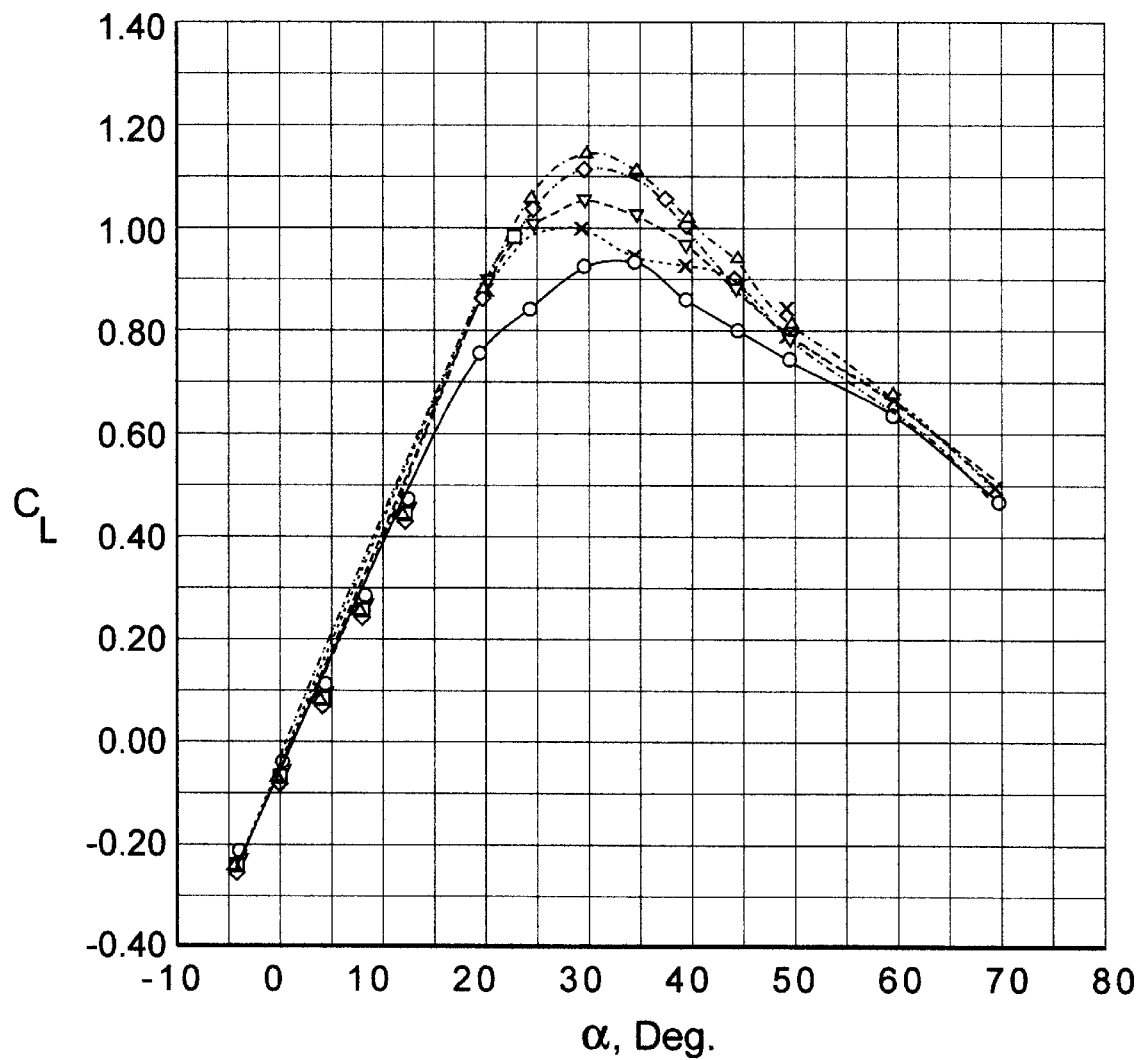
FIG. 8A illustrates lift coefficient versus angle-of-attack.
Figure 8B:
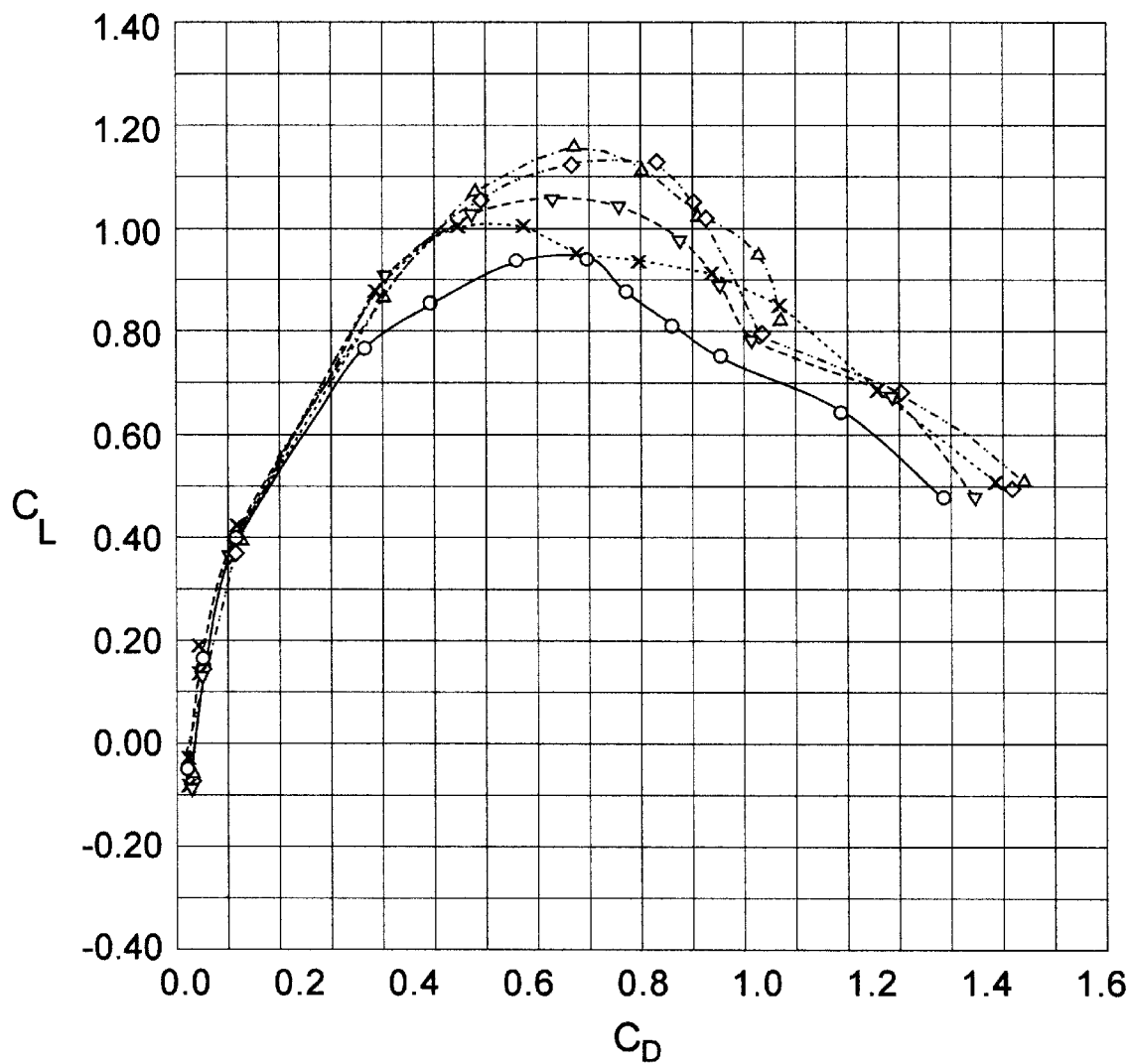
FIG. 8B illustrates lift coefficient versus drag coefficient.

The lift coefficient is normalized with the total planform area in all cases, so the dramatic increase in lift coefficient obtained by the inclusion of serrated-planform lifting surfaces 40 is not simply a consequence of the increased lifting surface area. Instead, the increased lift is a result of changes in the flow field produced by serrated-planform lifting surfaces 40. Unfortunately, the data in FIG. 7 suggest the possibility that at higher angles-of-attack, the baseline configuration will outperform the configurations which include serrated-planform lifting surfaces 40. Additional data, which was obtained from tests in the NASA Langley Research Center Subsonic Basic Research Tunnel with a Mach number of 0.14 dispel this notion. Although the tests in this wind tunnel were extended to higher angles-of-attack, the one-tooth embodiment shown in FIG. 5B was not included in these tests. Lift coefficient versus angle of attack is plotted in FIG. 8A. The symbols used to identify the curves are again defined in Table 1. The results are consistent with the results shown in FIG. 7. However, the additional range of data clearly shows the maximum lift coefficient. All of the configurations with serrated-planform lifting surfaces 40 have greater lift coefficients than the baseline case for angles-of-attack greater than about 15 degrees. At angles-of-attack below about 15 degrees, the differences in lift coefficient between the configurations are very small. In FIG. 8B, the lift coefficient is plotted versus the drag coefficient for the same configurations as in FIG. 8A. Except for the low angle-of-attack cases, for which differences in the lift coefficient are very small, configurations with serrated-planform lifting surfaces 40 have greater lift coefficients for any given drag coefficient. For angles-of-attack between about 15 degrees and somewhat beyond the angle-of-attack that corresponds to maximum lift coefficient, the drag coefficient for a given lift coefficient is less than or equal to that of the baseline configuration. This implies that the improved lift comes with little or no additional drag penalty.

The test data show that serrated-planform lifting surfaces 40 greatly improve the lifting capability of a baseline configuration. For the particular serrated-planform lifting surfaces 40 tested, increasing the number of teeth from 1 to 2 and then from 2 to 3 improved the lifting performance. Further increases of the number of teeth beyond 3 degraded the lifting performance, but not below the baseline level. Further testing will be needed to clarify the relationships between all of the relevant design parameters, but the current tests show that the governing principles are strongly non-linear and the vastly improved lift coefficients that are observed over such a large range of angle-of-attack with serrated-planform lifting surfaces 40 could not have been predicted.

Figure 9:
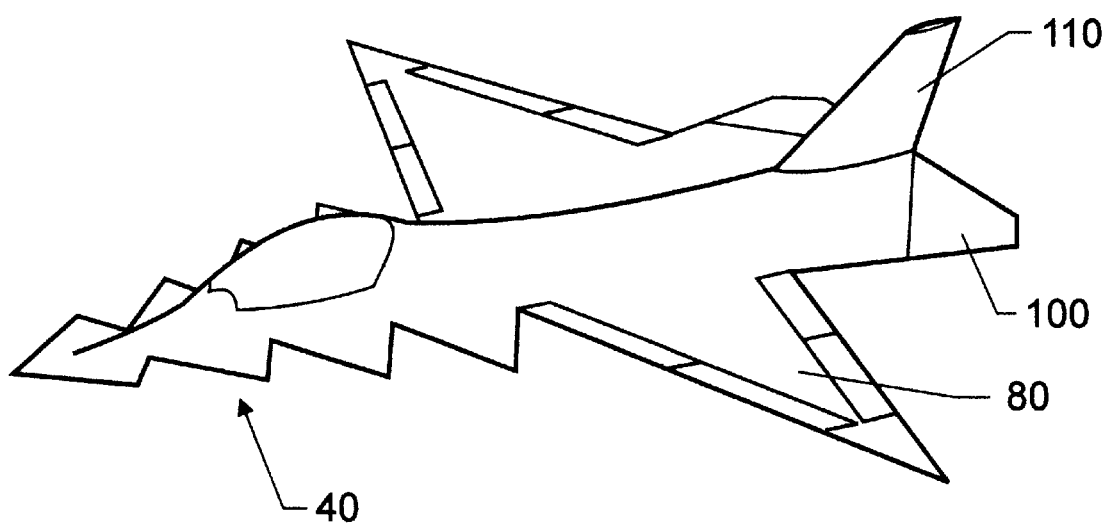
FIG. 9 illustrates an aircraft with a serrated-planform lifting surface upstream of each primary lifting surface.
Figure 11:
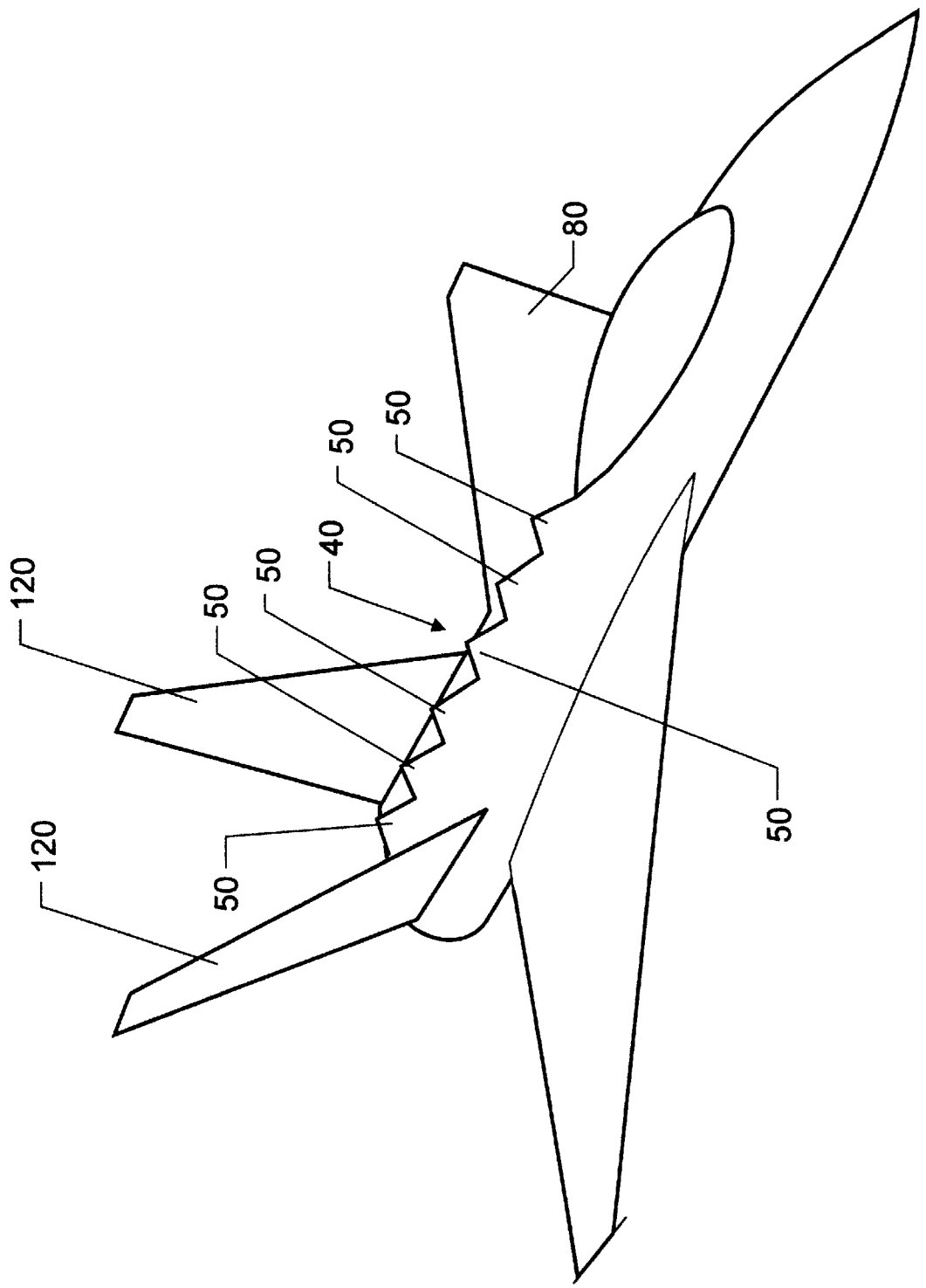
FIG. 11 illustrates an aircraft with a serrated-planform lifting surface upstream and between the planes of a butterfly tail.

Serrated-planform lifting surfaces 40 can be employed in many useful applications. In FIG. 9, serrated-planform lifting surfaces 40 are shown as forebodies upstream of each wing 80 of an aircraft. The figure illustrates serrated-planform lifting surfaces 40 in the same plane as wings 80, but different applications can employ the invention differently. For instance, in FIG. 10, serrated-planform lifting surface 40 is located above wing 80. In fact the most downstream tooth 50 is not disposed entirely forward of wing 80. Additionally this application shows that adjacent teeth 50 need not abut. Similarly, another embodiment (not illustrated) has serrated-planform lifting surface 40 located below wing 80. In general, various applications of the invention employ serrated-planform lifting surface 40 in planes above and/or below the plane of primary lifting surface 30. In other applications serrated-planform lifting surface 40 is rotated out of the plane of primary lifting surface 30. For instance, FIG. 11 shows an aircraft with a butterfly tail 120 and serrated-planform lifting surface 40 in a vertical plane between the planes of butterfly tail 120. In this configuration butterfly tail 120 is the relevant primary lifting surface 30.

Other embodiments do not require all teeth 50 of serrated-planform lifting surface 40 to be in the same plane. In some modes, the planes of individual teeth 50 are parallel to, but displaced from the planes of other teeth 50. In other modes, the planes of individual teeth 50 are rotated with respect to other teeth.

In some applications, individual teeth 50 of serrated-planform lifting surface 40 are retractable. A mechanism for retracting individual teeth is disclosed in Walters and Kern [U.S. Pat. No. 5,282,591 (1994)] which is incorporated herein by reference. Another means for retracting individual teeth 50 employs a power screw mounted to the inside edge of tooth 50. The rotational motion of an adjusting nut is converted into linear motion of the power screw, thus permitting linear motion of tooth 50 to any position between its fully deployed position and its fully retracted position.

The ability to retract individual teeth 50 enables serrated-planform lifting surface 40 to provide variable lift at constant angle-of-attack. When multiple serrated-planform lifting surfaces 40 are disposed symmetrically about the longitudinal axis or a longitudinal plane of an aerodynamic body, asymmetric retraction of one or more teeth 50 results in differential lift due to the respective serrated-planform lifting surfaces. The differential lift provides a means for controlling rolling moments. Missiles and torpedoes are two possible applications of such control Both of these applications are also examples of situations in which no additional primary lifting surface 30 is required.

Other possible applications of serrated-planform lifting surface 40 include use in fluidic control devices, diving-fin configurations for submersible vehicles, and automotive wing configurations.

Although the description above contains many specificities, these should not be construed as limiting the scope of the invention, but as merely providing illustrations of some of the presently preferred embodiments. Thus the scope of the invention should be determined by the appended claims and their legal equivalents, rather than by the examples given.

We claim:

1. An aerodynamic lifting device disposed upstream of a primary lifting surface; said aerodynamic lifting device comprising a plurality of teeth arranged essentially in tandem, each of said teeth being individually disposed in a plane that intersects said primary lifting surface.

2. An aerodynamic lifting device disposed upstream of a primary lifting surface as specified in claim 1 wherein said primary lifting surface is a tail.

3. An aerodynamic lifting device disposed upstream of a primary lifting surface as specified in claim 2 wherein said tail is a butterfly tail.

4. An aerodynamic lifting device disposed upstream of a primary lifting surface as specified in claim 1 wherein at least one of said teeth is controllably retractable.

5. A lift-producing configuration that comprises:
(a) a primary lifting surface and
(b) an aerodynamic lifting device disposed upstream of said primary lifting surface; said aerodynamic lifting device comprising a plurality of teeth arranged essentially in tandem, each of said teeth being individually disposed in a plane that intersects said primary lifting surface.

6. A lift-producing configuration as specified in claim 5 wherein said primary lifting surface is a tail.

7. A lift-producing configuration as specified in claim 6 wherein said tail is a butterfly tail.

8. A lift-producing configuration as specified in claim 5 wherein at least one of said teeth is controllably retractable.

* * * * *